Patented Feb. 1, 1944

2,340,449

UNITED STATES PATENT OFFICE 2,340,449

STABILIZED BITUMINOUS EMULSION

Allen C. Barwell, Kennett Square, Pa., assignor to Hercules Powder Company, Wilmington, Del., a corporation of Delaware No Drawing. Application May 8, 1941,
Serial No. 392,489

5 Claims. (Cl. 252—311.5)

This invention relates to stable emulsions of bituminous substances.

Bituminous emulsions are frequently prepared with use of aqueous rosin soap solutions as emulsifying agents. An improved type of bituminous emulsion has also been produced containing a soap of a substantially petroleum-hydrocarbon insoluble pine wood resin as emulsifying and stabilizing agent, as described in U. S. Patent 2,199,206. While the latter emulsions have sufficient stability for many purposes, their stability is not as high as desired in some applications, as for example for road surfacing emulsions. The emulsions tend to break prematurely in the mixing with certain aggregates, particularly where the amount of fines is relatively high.

It is an object of this invention to provide bituminous emulsions of improved stability characteristics.

A further object of this invention is to provide bituminous emulsions of high stability to admixture with solid materials of the nature of aggregates or of soil particles.

A further object of this invention is to provide emulsions having high dehydration values or rates of evaporation.

A further object of this invention is to provide relatively inexpensive stabilized emulsions not susceptible to putrefaction.

Other objects of the invention will appear hereinafter.

Broadly, the objects of this invention may be accomplished by use of a mixture of an alkali metal soap of a substantially petroleum-hydrocarbon insoluble pine wood resin and an inorganic cementitious calcareous material as stabilizing agents in a bitumen emulsion containing a bituminous substance and water. It has been found in accordance with this invention that such a mixture of emulsifying and/or stabilizing agents provides emulsions of considerably greater stability than have been obtainable heretofore. The emulsions prepared according to the invention are entirely satisfactory as road surfacing emulsions and are sufficiently stable to pass the most severe cement mixing tests. They are also highly satisfactory for use in soil stabilization.

The resin which may thus be saponified and which is characterized by the term "substantially petroleum-hydrocarbon insoluble pine wood resin" herein and in the appended claims is the resinous material which may be prepared from pine wood, preferably from stump pine wood in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum-hydrocarbon such as, for example, gasoline, dissolves and removes the rosin. After separation of the rosin, high in abietic acid, a resinous residue remains which is low in abietic acid. This resinous residue, used in the composition of the present invention, is characterized by a dark red-brown color, cherry red in solution, and by substantial insolubility in petroleum hydrocarbons; but it will vary somewhat in its specific characteristics such as acid number, melting point, exact petroleum ether solubility, and content of naphtha and toluol insoluble material, depending upon the details of the extraction processes utilized. The resinous residue may be deformed by steaming or heat treating to remove volatile substances.

Another method of producing this resin comprises treating the benzol extracted wood rosin with a mixture of gasoline and furfural which effectively dissolves the rosin in the gasoline and the resin in the furfural. The mixture is then permitted to stand and settle until two layers are formed which are separated. The furfural layer is then run through a still to remove the furfural, and the resin is recovered.

This resin will meet or nearly meet the following specifications; namely, substantial insolubility in petroleum hydrocarbons, substantially complete solubility in alcohol, a methoxy content from about 3% to about 7.5% (usually from about 4% to about 6%), an acid number in the range from about 80 to about 110, and a drop melting point in the range from about 95° C. to about 125° C.

The alkali metal soap of the above substantially petroleum-hydrocarbon insoluble resin described above for use in the present invention may be produced by saponification of the resin with an alkaline alkali metal compound either by heating or at normal temperatures. In preparing the soap solution at ordinary temperatures, the resin may be dispersed in water and the alkali metal compound added without heating. By either method soap solutions having the desirable properties for use in this invention are obtained.

The inorganic cementitious calcareous materials which possess the stabilizing characteristics useful in this invention are, for example, Portland cement, lime, lime mortar, etc. Portland cement and lime are generally preferable since the stabilization effects produced by small amounts of these materials are generally more pronounced than the effects of the other calcareous materials.

Any bituminous substances may be employed in the emulsions according to this invention. Thus, bitumens such as asphalts and asphaltics, pyrobitumens such as elaterite, pyrogenous distillates such as coal and shale tars, pyrogenous residues such as blown petroleum asphalts, fatty acid pitch and rosin pitch may be employed. The emulsions of asphalt according to this invention are particularly useful and advantageous as road surfacing emulsions.

The improved bitumen emulsions of this invention may be prepared by emulsifying a bituminous substance and water with the soap of the substantially petroleum-hydrocarbon insoluble resin and the inorganic cementitious calcareous material in any suitable manner. Additional emulsifying and stabilizing agents known in the art may be included, if desired. The saponified resin and calcareous material may be added to either the water or the bitumen phase prior to emulsification or they may be dispersed in the emulsion after its formation in any suitable manner. It will be preferred to add the saponified resin to the aqueous phase prior to emulsification. It will also be desirable to employ with the saponified substantially petroleum-hydrocarbon insoluble pine wood resin a slight excess of alkali, since this tends to form a more stable emulsion, although this is not necessarily essential to the stabilization.

While the saponified resin alone exerts a strong stabilizing effect, the inclusion of an inorganic cementitious calcareous material in conjunction with the saponified resin exerts a much stronger stabilizing effect especially in regard to stability of the emulsion to admixture with materials of the nature of aggregates. Because of the greatly increased stability of emulsions containing both these materials over those containing the saponified resin alone, a smaller amount of the saponified resin is necessary to stabilize an emulsion to a given stability when employed in conjunction with the calcareous material than when employed alone. This is an important advantage not only because of the saving in the amount of the saponified resin soap required, but also because emulsions of higher dehydration value or rate of evaporation may be produced when the smaller amount of soap is employed.

The amounts of cementitious calcareous material necessary to develop the strong stabilizing effects according to this invention is very small. An amount of such material which is considerably less than the amount by weight of saponified resin employed is generally sufficient to develop an effect approaching the maximum stabilizing effect possible when employing these materials together. Further increases in ratio of calcareous material to saponified resin effect very little increase in emulsion stability, although larger amounts of calcareous materials than necessary may be employed without detriment to the emulsion stability. Thus, the amount will generally not exceed about 0.5 per cent based on the total weight of emulsion. The specific amounts of saponified substantially petroleum-hydrocarbon insoluble pine wood resin and inorganic cementitious calcareous material employed may not, however, be exactly stated since they may vary according to the exact composition of the saponified resin and of the calcareous material, on the desired degree of stability of the emulsion, the pH of the emulsion, etc. However, the examples following herein will serve to illustrate the amount which may be employed in a given case.

The fact that an inorganic calcareous cementitious material in conjunction with the saponified rosin will exert the pronounced stabilizing effect is very surprising in view of the negligible stabilizing effect of such calcareous materials when employed alone, and especially in view of the fact that very little if any increase in stabilizing effect is obtained when these materials are used with other soaps such as ordinary rosin soaps. However, it appears probable that the very high stabilizing action obtained according to this invention is due to some reaction between the calcareous material and the saponified resin employed.

The examples which follow will serve to illustrate the improved stable emulsions of this invention and the improved characteristics thereof. As a means of measuring the high stability of the emulsions, the well-known cement mixing test widely used in specifications for road surfacing emulsions and described in "Modern Road Emulsions," second edition, by F. H. Garner, L. G. Gabriel, and H. J. Prentice, printed by John Bellows, Ltd., Gloucester, may be employed. This test provides a desirable method of testing the stability of bitumen emulsions against the physical and chemical action occurring on mixing with materials such as aggregates containing finely divided materials. The test was carried out in the examples as follows: To 50 grams of Portland high early strength cement (100% through 80 mesh) in a standard beaker were added 100 grams of a bituminous emulsion containing 55% solids (100% passing a 20-mesh sieve), and this mixture stirred slowly (60 times per minute) for one minute. To this was added 150 cc. of distilled water, and the resulting mixture stirred at the rate of 60 times per minute for three minutes. The contents of the beaker were poured over a 14-mesh iron screen, and the beaker and the residue on the screen washed with distilled water until the washings were appreciably clean. The screen, residue, stirring rod and container were dried, then weighed, and the weight of rod, beaker and screen subtracted. The residue in grams represents coagulated bitumen and occluded cement. Most specifications for road surfacing emulsions call for 5 grams or less residue by this test. In the examples following, the emulsions will be designated as having passed the cement mixing test when leaving a residue of less than 5 grams and designated as having failed when leaving a residue of greater than 5 grams in the test.

Unless otherwise indicated, the parts of material stated in the following examples are parts by weight.

*Example I*

An emulsion was made with 600 parts of a Venezuelan asphalt, 400 parts of water, 20 parts of a sodium hydroxide saponified substantially petroleum-hydrocarbon insoluble pine wood resin and 2 parts of sodium hydroxide. The stability of this emulsion was tested by the cement mixing test, the dried residue weighing 59 grams.

A similar emulsion was produced from the same asphalt and stabilized with one part of Portland cement added to the water phase before emulsification of the asphalt. This emulsion left a residue of 1 gram in the cement mixing test. This emulsion also passed the lime-cement test, a modification of the cement mixing test in which 25 grams of cement and 25 grams of lime are used instead of 50 grams of cement. This is a more severe test of stability than the cement mixing test.

The emulsion of the first part of this example was stabilized by adding ½ part of Portland cement to 100 parts of the emulsion. The resulting emulsion left a residue of 2 grams in the cement mixing test.

Example II

Six hundred parts of a Venezuelan asphalt was emulsified with 400 parts of water and 15 parts of the sodium hydroxide saponified substantially petroleum-hydrocarbon insoluble pine wood resin soap and 2 parts of free sodium hydroxide. Two samples were prepared, one with 0.1% cement based on the weight of emulsion in the water phase, and the other with no cement. The emulsion containing the cement passed the cement mixing test, leaving 2 grams of residue while the emulsion without cement left a residue of 73 grams indicating failure to pass the test.

A portion of the emulsion which had not been stabilized with cement was then stabilized as follows: To 92.5 grams of the emulsion was added ½ gram of cement in 7 grams of water. The resulting mixture was stirred for 10 minutes and tested for stability by the cement mixing test. It passed the test leaving only a trace of residue.

Example III

An emulsion was made with 600 parts of a Venezuelan asphalt, 400 parts of water, 10 parts of sodium hydroxide saponified substantially petroleum-hydrocarbon insoluble pine wood resin and 2 parts of free sodium hydroxide. A portion of this emulsion was stabilized by the addition of 0.2% lime based on the weight of emulsion. Thus stabilized it passed the cement mixing test. Without the lime stabilization, the same emulsion failed the cement mixing test. A similar emulsion prepared with 1.5% of the sodium hydroxide saponified resin and 0.2% free sodium hydroxide, without cement stabilization likewise failed the test.

It will be understood that the details and examples hereinbefore set forth are illustrative only, and that the invention as broadly described and claimed is in no way limited thereby.

What I claim and desire to protect by Letters Patent is:

1. A stable bituminous emulsion comprising a bituminous substance, water, and as a stabilizing and emulsifying agent a mixture of from about 1.0 to about 2.0 per cent of an alkali metal soap of a substantially petroleum-hydrocarbon insoluble pine wood resin and from about 0.1 to about 0.5 per cent of an inorganic cementitious calcareous material, the amounts being based on the total weight of the emulsion.

2. A stable asphalt emulsion comprising an asphalt, water, and as a stabilizing and emulsifying agent a mixture of from about 1.0 to about 2.0 per cent of an alkali metal soap of a substantially petroleum-hydrocarbon insoluble pine wood resin and from about 0.1 to about 0.5 per cent of an inorganic cementitious calcareous material, the amounts being based on the total weight of the emulsion.

3. A stable asphalt emulsion comprising an asphalt, water, and as a stabilizing and emulsifying agent a mixture of from about 1.0 to about 2.0 per cent of an alkali metal soap of a substantially petroleum-hydrocarbon insoluble pine wood resin and from about 0.1 to about 0.5 per cent of Portland cement, the amounts being based on the total weight of the emulsion.

4. A stable asphalt emulsion comprising an asphalt, water, and as a stabilizing and emulsifying agent a mixture of from about 1.0 to about 2.0 per cent of an alkali metal soap of a substantially petroleum-hydrocarbon insoluble pine wood resin and from about 0.1 to about 0.5 per cent of lime, the amounts being based on the total weight of the emulsion.

5. A stable asphalt emulsion comprising an asphalt, water, and as a stabilizing and emulsifying agent a mixture of from about 1.0 to about 2.0 per cent of an alkali metal soap of a substantially petroleum-hydrocarbon insoluble pine wood resin and from about 0.1 to about 0.5 per cent of lime mortar, the amounts being based on the total weight of the emulsion.

ALLEN C. BARWELL.